United States Patent
Gomes et al.

(10) Patent No.: US 7,102,813 B2
(45) Date of Patent: Sep. 5, 2006

(54) CONTINUOUS WAVE PUMPED PARALLEL FIBER OPTICAL PARAMETRIC AMPLIFIER

(75) Inventors: Anderson Gomes, Recife (BR); Claudio Florida, Recife (BR); Michael Sundheimer, Recife (BR); Miriam R. X. De Barros, Campinas (BR); Joao B. Rosolem, Campinas (BR)

(73) Assignee: Ericsson Telecommunicacoes S.A., Sao Paulo (BR)

( * ) Notice: Subject to any disclaimer, the term of this patent is extended or adjusted under 35 U.S.C. 154(b) by 0 days.

(21) Appl. No.: 10/535,507

(22) PCT Filed: Dec. 5, 2002

(86) PCT No.: PCT/BR02/00174

§ 371 (c)(1),
(2), (4) Date: Sep. 7, 2005

(87) PCT Pub. No.: WO2004/051892

PCT Pub. Date: Jun. 17, 2004

(65) Prior Publication Data

US 2006/0126163 A1   Jun. 15, 2006

(51) Int. Cl.
  *H01S 3/067* (2006.01)
(52) U.S. Cl. .................. 359/346; 359/349
(58) Field of Classification Search ........... 359/330, 359/346, 359
  See application file for complete search history.

(56) References Cited

U.S. PATENT DOCUMENTS

| | | | |
|---|---|---|---|
| 5,400,164 A * | 3/1995 | Kurtzke et al. | 398/150 |
| 5,452,116 A | 9/1995 | Kirkby et al. | |
| 6,049,417 A | 4/2000 | Srivastava et al. | |
| 6,052,218 A | 4/2000 | Daunt et al. | |
| 6,239,903 B1 | 5/2001 | Islam et al. | |
| 6,317,254 B1 | 11/2001 | Park et al. | |
| 6,344,921 B1 * | 2/2002 | Galvanauskas et al. | 359/332 |

FOREIGN PATENT DOCUMENTS

| | | |
|---|---|---|
| EP | 0 617 527 | 9/1994 |
| EP | 0 883 218 | 12/1998 |

OTHER PUBLICATIONS

International Search Report for PCT/BR02/00174 dated Jul. 29, 2003.

(Continued)

*Primary Examiner*—Mark Hellner
(74) *Attorney, Agent, or Firm*—Nixon & Vanderhye P.C.

(57) ABSTRACT

A number of nonlinear optical fibers are configured in a parallel configuration. The fibers are pumped with optical pumps having a wavelength slightly longer than the zero dispersion wavelength for each fiber. By a demultiplexer optical signals within a certain wavelength interval are admitted to enter and exit the different fibers, in which parametric amplification can be achieved. By selecting the pump wavelength outside each corresponding interval crosstalk will be suppressed. The nonlinear fibers can be pumped by separate laser pumps, or two or more of the nonlinear fibers can be pumped by a common pump, depending on the different fiber properties. By tailoring fiber properties such as the zero dispersion wavelength, the second order dispersion coefficient and the fourth order dispersion coefficient, beneficial amplification characteristics can be achieved in different wavelength intervals.

25 Claims, 7 Drawing Sheets

OTHER PUBLICATIONS

Jonas Hansryd and Peter A. Andrekson; "Broad-Band Continous-Wave-Pumped Fiber Optical Parameteric Amplifier with 49-dB Gain and Wavelength-Conversion Efficiency;" IEEE Photonics Technology Letters; vol. 13, No. 3; Mar. 2001; pp. 194-196.

Ho et al.; "200-nm-Bandwidth Fiber Optical Amplifier Combining Parametric and Raman Gain;" Journal of Lightwave Technology; vol. 19, No. 7; Jul. 2001; pp. 977-981.

Chapter 10, "Parametric Processes;" Phase-Matching Techniques; pp. 404-435.

McKinstrie et al.; "Parameteric Amplifiers Driven by Two Pump Waves;" IEEE Journal of Selected Topics in Quantum Electronics; vol. 8, No. 3; May/Jun. 2002; pp. 538-547.

* cited by examiner

CONTINUOUS WAVE PUMPED PARALLEL FIBER OPTICAL PARAMETRIC AMPLIFIER

This application is the U.S. national phase of international application PCT/BR2002/000174, filed 5 Dec. 2002 which designated the U.S. and claims benefit of same, the entire contents of which are hereby incorporated by reference.

TECHNICAL FIELD

The present invention relates in general to optical fiber amplifiers and in particular to parametric amplifiers with suppressed crosstalk.

BACKGROUND

Data communication of different kinds becomes more and more frequent today. This development demands higher bandwidth available for the communication. The capacity of different types of telecommunication systems has increased tremendously during the last decade. An increasing part of the capacity is supplied by optical fibers that present bandwidth enhancements of several magnitudes compared with ordinary wires.

The bandwidth of optical fibers is used in an efficient manner by employing Wavelength Division Multiplexing (WDM) techniques. Many channels using a multitude of slightly different wavelengths may be transported simultaneously in one and the same optical fiber without interfering with each other. In recent years Dense Wavelength Division Multiplexing (DWDM) techniques have developed, bringing the utilization of the frequency dimension one further step. The useful spectrum is divided in different bands, a S-band (Short band) ranging from 1460 nm to 1530 nm a C-band (Conventional band) ranging from 1525.6 nm to 1562.5 nm and a L-band (Long band) ranging from 1569.4 to 1612.8 nm.

A major problem in optical communication is the attenuation of optical signal due to inherent fiber losses. After being transported some distance, the optical signals are attenuated and have to be restored in one or another way. By introducing optical amplifiers, any transition into electronic signals is unnecessary. However, amplification of broad wavelength bands, e.g. the complete S-, C-, and L-bands, carrying a number of WDM channels is not completely straightforward. Several different amplifier approaches are presented in prior art.

Rare-earth doped optical fiber amplifiers are a class of optical amplifier widely used. They exhibit low noise, they can be operated over fairly large bandwidths and show negligible crosstalk. However, the operational wavelength region depends on the doping ion.

Optical amplifiers have also been based on Raman effects, through the Stimulated Raman Scattering (SRS). SRS is a nonlinear process in which new frequencies are generated through energy transfer between an optical wave and the medium, due to the excitation of an optical phonon. As it is a nonresonant process, gain is made available at any wavelength. In the case of silica, this frequency shift peaks around 13 THz from the pump frequency. The down-shifted frequency is known as the Stokes shifted frequency. The Raman gain extends over about 40 THz, but the useful bandwidth for application purposes is less than that.

A third type of optical amplifiers is a Fiber Optical Parametric Amplifier (FOPA). This type of amplifier has been studied intensively in recent years due to their potential use for amplification and wavelength conversion in Dense Wavelength Division Multiplexing (DWDM) transmission systems. They have attracted interest because the band of amplification depends on the design of the fiber used and thus can be moved outside the conventional rare-earth window band. This will allow the use of the full low-loss window of fused silica fiber. Fiber optical parametric amplifiers are able to operate in any of the telecommunication bands (S-C-L) depending upon pump wavelength and the fiber zero dispersion wavelength, which can in principle be appropriately tailored from 1300 nm to 1600 nm.

A fiber optical parametric amplifier operates based on the nonlinear process of wave mixing, whereby a pump source at a given wavelength close to the zero dispersion wavelength of an optical fiber leads to the generation of idler and signal bands from spontaneous noise. If an externally injected signal is simultaneously applied, it can be amplified in any of the signal or idler band, which are basically symmetrically located with respect to the pump wavelength.

Fiber optical parametric amplifiers are conventionally known for having a low efficiency, which means that very high laser pump power would be needed. The gain of a fiber optical parametric amplifier depends in general on three parameters; the nonlinear coefficient □, the length L of the fiber used as amplification medium and pump power $P_P$. A low nonlinear coefficient calls for use of a high pump power or a long fiber length. However, recently, optical fibers having higher nonlinear coefficients have been even commercially available.

A relatively large problem with fiber optical parametric amplifiers is that the amplification principle gives rise to crosstalk. Optical signals having one wavelength will during the amplification process give rise to "false" signals at other wavelengths due to Four-Wave mixing (FWM). In DWDM systems, such crosstalk can generally not be accepted.

RELATED ART

In U.S. Pat. No. 6,239,903 fiber optical parametric amplifiers are used in series with Raman amplifiers in order to widen the amplification gain. A similar approach is shown in M. C. Ho, K. Uesaka, M. E. Marhic, Y. Akasaka and L. G. Kazovsky, "200-nm-Bandwidth Fiber Optical Amplifier Combined Parametric and Raman Gain", IEEE J. Lightwave Technol. 19, 977–979 (2001). In U.S. Pat. No. 6,049,417 parallel sub-bands are amplified by use of different types of rare-earth optical amplifiers. In U.S. Pat. No. 5,452,116, parallel optical sub-band amplifiers are used in series with single full-band amplifiers to compensate for uneven gain characteristics. In J. Hansryd and P. A. Andrekson, "Broadband continuous-wave-pumped fiber optical parametric amplifier with 49-dB gain and wavelength-conversion efficiency", IEEE Photon. Technol. Lett. 13, 194–196 (2001) multi-segment fiber design is used to achieve a relative large bandwidth and high gain parametric amplifiers. Dual pump schemes have also been employed, see e.g. C. J. McKinstrie, S. Radic and A. R. Chraplyvy, "Parametric amplifiers driven by two pump waves", IEEE Select. Topics Quantum Electron. 8, 538–547 (2002).

SUMMARY

One common problem with parametric amplifier solutions according to prior-art is according to previous discussions potential crosstalk from four-wave mixing products. Moreover, there is a general lack of flatness of the available gain bandwidth, calling for extra flattening devices. Furthermore, an increased bandwidth is also generally requested.

An object of the present invention is therefore to provide a parametric amplifier device and method with improved suppression of crosstalk. A further object of the present invention is to provide a parametric amplifier device and method giving amplification in a wide frequency band. Yet a further object of the present invention is to provide a parametric amplifier device and method having a gain flatness sufficient for e.g. wavelength division multiplexing applications. Additional objects are to produce high gains, preferably over 20 dB over wide bandwidths. Also, the amplifiers should preferably be operable in any spectral region within the low-loss band of optical fibers.

The above objects are achieved by devices, systems and methods according to the enclosed patent claims. In general, a number of nonlinear optical fibers are configured in a parallel configuration. The fibers are pumped with optical pumps having a wavelength slightly longer than the zero dispersion wavelength for each fiber. By admitting optical signals within a certain wavelength interval to enter and exit the different fibers, parametric amplification can be achieved. By selecting the admitted wavelength intervals, preferably located at a high-gain part of the amplified spectrum, such that the pump wavelength is situated outside the interval, crosstalk due to conjugated signals with respect to the pump wavelength will be suppressed.

The nonlinear fibers can be pumped by separate laser pumps, or two or more of the nonlinear fibers can be pumped by the same pump, depending on the different fiber properties. By tailoring fiber properties such as the zero dispersion wavelength, the second order dispersion coefficient and the fourth order dispersion coefficient, beneficial amplification characteristics can be achieved in different wavelength intervals. By combining a number of such tailored sub-band amplifiers, crosstalk suppressed parametric amplification can be achieved. The amplifiers are preferably used in WDM or DWDM systems.

With the present invention, practically all crosstalk due to conjugate generation is suppressed. Furthermore, high gains are achieved within a broadband spectrum ranging from about 1250 nm to about 1650 nm, thus covering the S-C-L band. Under appropriate conditions, these generated bands are flat enough that no extra flattening device is required.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present invention, it will be demonstrated a new scheme employing parallel configuration, which makes it possible to reduce crosstalk. The same scheme may be further utilized to expand the useful bandwidth. Even using commercially available optical fibers, with the highest nonlinearity they allow, it will be shown that with the present scheme a much greater bandwidth is possible.

The basic operation principle of fiber optical parametric amplifiers is known in prior art. An optical fiber is used, having nonlinear properties. Due to four-wave mixing, a high-intensity optical signal may be transferred into optical signals having a different wavelength. If one specific frequency is applied to a nonlinear optical fiber, the sideband frequencies may build up from noise under the proper circumstances. The optimum operational condition occurs when the pump wavelength is slightly longer than the zero dispersion wavelength of the nonlinear fiber. Gain spectra are approximately symmetrical with respect to the pump presenting a signal and an idler band. For a deeper understanding of the basic physical principles, references are made to G. P. Agrawal, "Nonlinear fiber optics", 2nd ed., Academic Press, San Diego, 1995, pp. 404–435, and J. Hansryd, P. A. Andrekson, M. Westlund, J. Li and P.-O. Hedekvist, "Fiber-based optical parametric amplifiers and their applications", IEEE Select. Topics Quantum Electron. 8, 506–520 (2002).

However, generation of the idler can lead to Four-Wave Mixing (FWM) crosstalk with channels in the idler band. This particular crosstalk originates from creation of conjugated signals with respect to the pump wavelength and is a large contributor to the total crosstalk in parametric amplifiers. The origin of the conjugated signal crosstalk is found in the nonlinear effects in the optical fiber and is thus unique for parametric amplifiers. The creation of crosstalk signals limits the useful bandwidth in a typical case to half the total created gain spectrum. This also sets a limit of the practical use of prior-art fiber optical parametric amplifiers, because the signal band is in practice only on the order of 15 to 25 nm. However, if one exploits a parallel geometry, such as the one proposed below, one is able to reduce crosstalk, in particular conjugated signals with respect to the optical pump wavelength. As a further advantage, the useful band of operation can be increased and a flat gain spectrum may be created.

Figure 1:
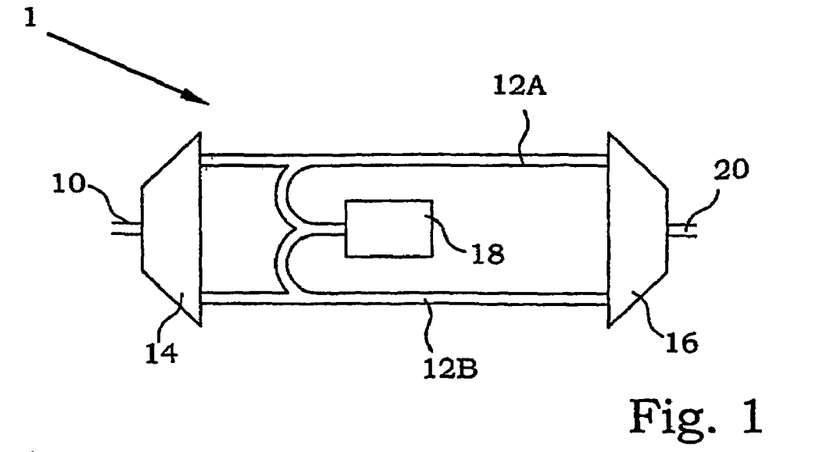
FIG. 1 is a schematic illustration of an embodiment of an optical amplifier device according to the present invention.

In FIG. 1, one embodiment of an optical amplifier device 1 according to the present invention is illustrated. An optical input 10, e.g. an incoming optical fiber, is assumed to transport a number of optical signals of different wavelengths. The optical signals are split into two sub-bands in an optical demultiplexer 14. The sub-bands are exclusive, i.e. they have no overlapping parts. Signals from one sub-band are passed into a first branch having a nonlinear optical fiber 12A and signals from the other sub-band are passed into a second branch having a nonlinear optical fiber 12B.

The first and second nonlinear optical fibers 12A and 12B have in the present embodiment substantially the same properties, regarding e.g. nonlinearity or dispersion. An optical pump, in this embodiment a laser pump 18 is arranged to supply both the nonlinear optical fibers 12A, 12B with basically monochromatic light, having a pump wavelength $\lambda_P$. The laser pump 18 is preferably tunable for to enabling fine adjustments of the pump wavelength $\lambda_P$. A linewidth of about 0.1 μm is preferred since Brillouin scattering effects then are avoided. The optical fibers 12A, 12B are nonlinear, i.e. they present a γ value (nonlinearity coefficient) larger than zero, preferably considerably larger. The optical fibers 12A, 12B have further a zero dispersion wavelength $\lambda_0$, which is slightly shorter than the pump wavelength $\lambda_P$.

The nonlinear optical fibers 12A and 12B are further connected to an optical multiplexer 16, merging or multiplexing the signals from the nonlinear optical fibers 12A, 12B into an optical output 20, e.g. an outgoing optical fiber. The optical multiplexer 16 is a "mirror" device to the optical demultiplexer 14 in the sense that only signals appearing in the first sub-band are allowed from the first nonlinear optical fiber 12A and only signals appearing in the second sub-band are allowed from the second nonlinear optical fiber 12B.

Figure 2A:
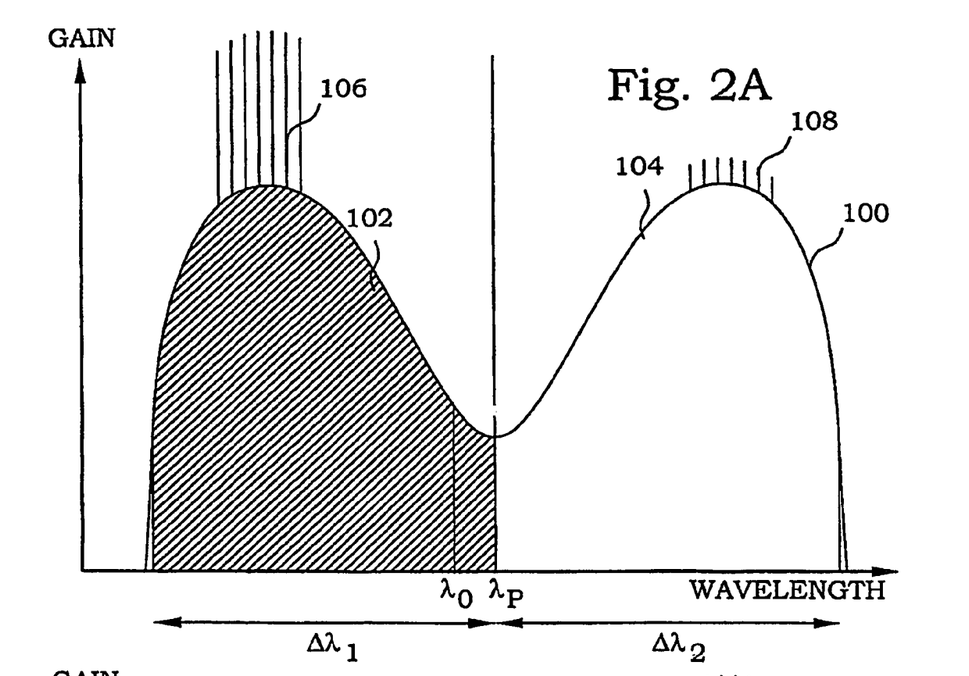
FIG. 2A is a diagram illustrating an ideal gain spectrum of parametric amplification in one of the nonlinear fibers of FIG. 1.

FIG. 2A is a diagram illustrating an idealized optical spectrum 100 achieved from a fiber optical parametric amplifier, i.e. a nonlinear optical fiber supplied by a laser pump of suitable wavelength. The gain presents two bands, a signal band 102 having shorter wavelengths than the pump wavelength $\lambda_P$, and an idler band 104 having longer wavelengths than the pump wavelength $\lambda_P$. The idler band 104 is substantially a mirror band of the signal band 102 with respect to the pump wavelength $\lambda_P$. One may also notice that the zero dispersion wavelength $\lambda_0$ is somewhat shorter than the pump wavelength $\lambda_P$. Optical signals 106 are provided within the signal band and are amplified accordingly. However, due to FWM effects, crosstalk signals 108 do also appear in the idler band 104. These crosstalk signals are conjugated signals of the optical signals 106 with respect of the pump wavelength $\lambda_P$. In the present embodiment, the zero dispersion wavelength $\lambda_0$ was 1545 nm and the pump wavelength chosen such that the second order dispersion coefficient $\beta_2$ is equal to −0.035 ps²/km.

If only optical signals 106 in a sub-band $\Delta\lambda_1$ are allowed, where the sub-band $\Delta\lambda_1$ is limited to one side of the pump wavelength $\lambda_P$, any crosstalk signals 108, being conjugated signals of the optical signals 106 with respect to the pump signal, will appear at the other side of the pump wavelength $\lambda_P$. In FIG. 2A, sub-band $\Delta\lambda_1$ is a sub-band ranging over a wavelength interval having the pump wavelength $\lambda_P$ as an upper limit. The crosstalk signals 108 then appear in a sub-band $\Delta\lambda_2$, ranging over a wavelength interval having the pump wavelength $\lambda_P$ as a lower limit. In order to suppress crosstalk the pump wavelength has to be situated outside any sub-band allowed to be amplified by the parametric amplifier in that particular branch.

Studying FIG. 2A, while having the configuration of FIG. 1 in mind, the situation described in FIG. 2A may correspond to the first nonlinear optical fiber 12A. Optical signals 106 in sub-band $\Delta\lambda_1$ are the only ones allowed to enter the first nonlinear optical fiber 12A. Similarly, optical signals in the sub-band $\Delta\lambda_1$ are also the only ones allowed to be transferred from the first branch, i.e. from the first nonlinear optical fiber 12A into the optical output fiber 20. This means that the crosstalk signals 108 are prohibited to enter the output fiber 20. The contribution from the first nonlinear optical fiber 12A to the signal in the output fiber 20 will then correspond to the hatched portion in FIG. 2A.

Figure 2B:
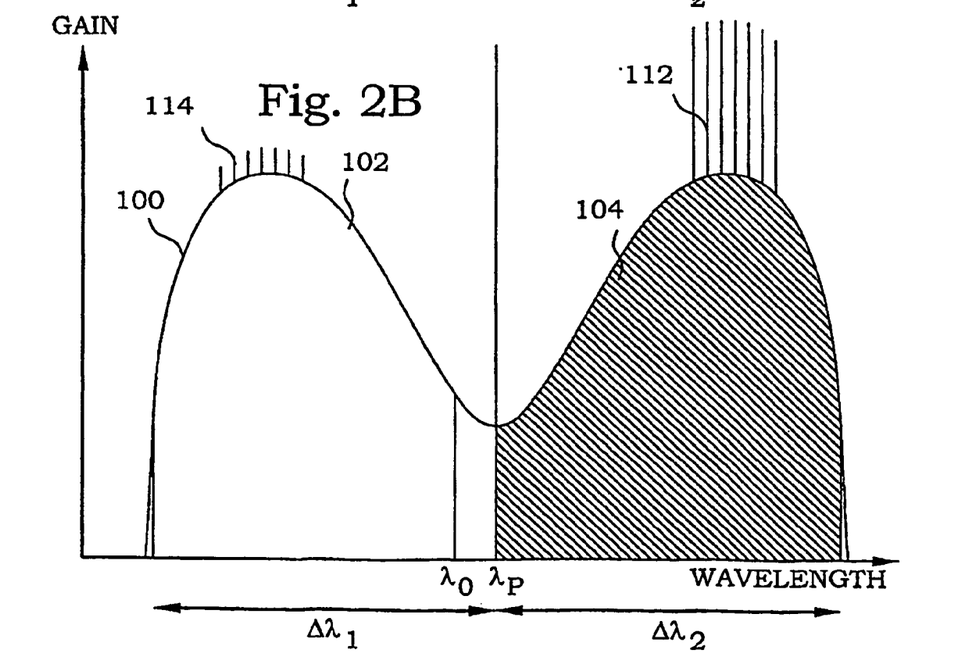
FIG. 2B is a diagram illustrating an ideal gain spectrum of parametric amplification in another of the nonlinear fibers of FIG. 1.

FIG. 2B illustrates a corresponding situation in the second branch, i.e. in the second nonlinear optical fiber 12B. Here, optical signals 112 in the sub-band $\Delta\lambda_2$ are allowed to enter. The optical signals 112 are amplified in the idler band 104 and give rise to crosstalk signals 114 in the signal band 102. Since only optical signals within the sub-band $\Delta\lambda_2$ are allowed to be transferred from the second nonlinear optical fiber 12B into the output optical fiber 20, the crosstalk signals 114 are suppressed.

Figure 2C:
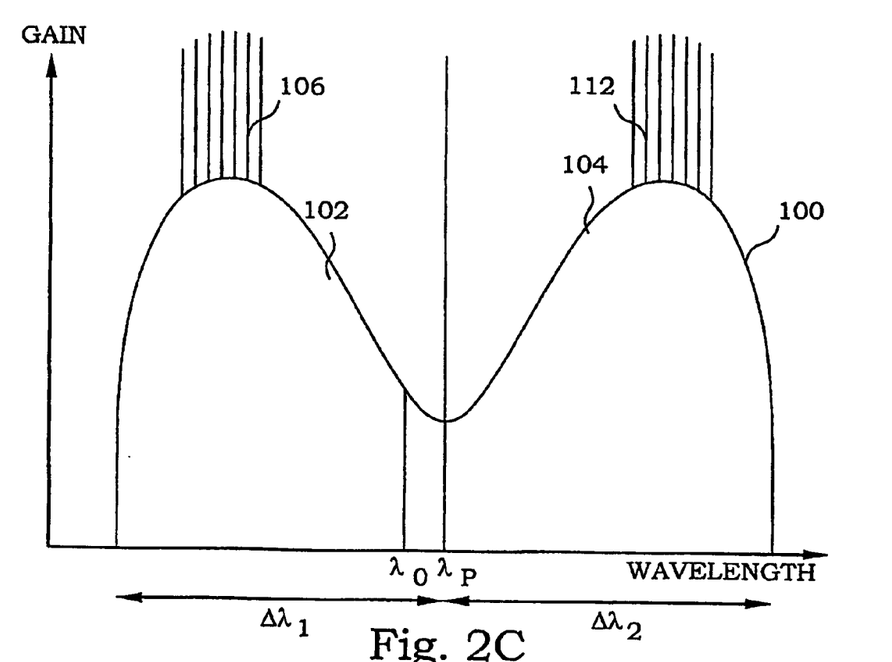
FIG. 2C is a diagram illustrating an ideal gain spectrum of parametric amplification in the combined signal in the optical output of FIG. 1.

FIG. 2C illustrates the ideal optical spectrum in the output fiber 20. As easily noticed, the output of the parallel amplifier configuration is a combination of the two spectra of FIGS. 2A and 2B, which is less influenced by crosstalk signals. The bandwidth 1532 nm to 1555 nm is furthermore doubled compared with typical prior-art parametric amplifiers. One should bear in mind that some crosstalk still exist, since crosstalk also appears from interaction between e.g. two signal wavelengths in the same sub-band. However, conjugated signals with respect to the pump wavelength are, due to the high intensity of the pump wavelength, a large contribution to the overall crosstalk in parametric amplifier systems.

The gain of FIG. 2C varies significantly over the bandwidth, which also is somewhat disturbing in certain applications. Amplification flattening devices (not shown) may be applied for providing a more even gain spectrum. Also, in many applications, even higher bandwidths than achieved in FIG. 2C are required.

Figure 3:
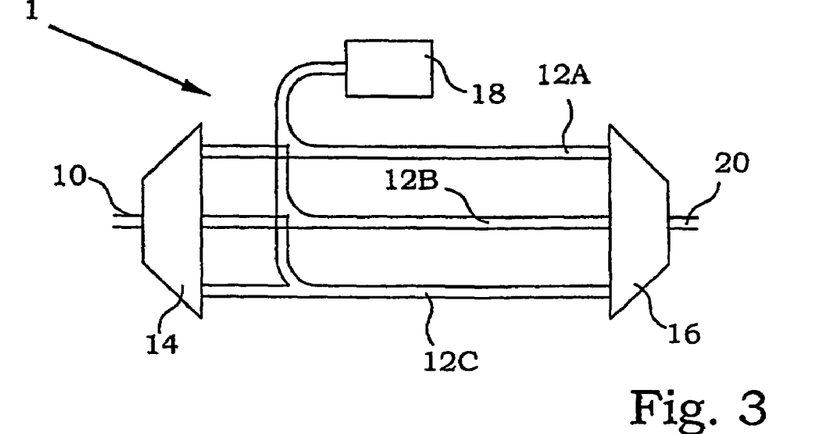
FIG. 3 is a schematic illustration of another embodiment of an optical amplifier device according to the present invention.

In FIG. 3 a further development of the basic principle of FIG. 1 is illustrated as another embodiment according to the present invention. First of all, in this embodiment, three nonlinear optical fibers 12A, 12B and 12C are present. The optical demultiplexer 14 and optical multiplexer 16 are adapted accordingly, dividing the incoming optical signals into three sub-bands. All nonlinear optical fibers 12A–C are in this embodiment pumped with the same laser pump 18. As an illustrative example, the pump wavelength $\lambda_P$ is set to 1450 nm. However, unlike the situation in FIG. 1, the different nonlinear optical fibers 12A–C have different optical properties.

Figure 4:
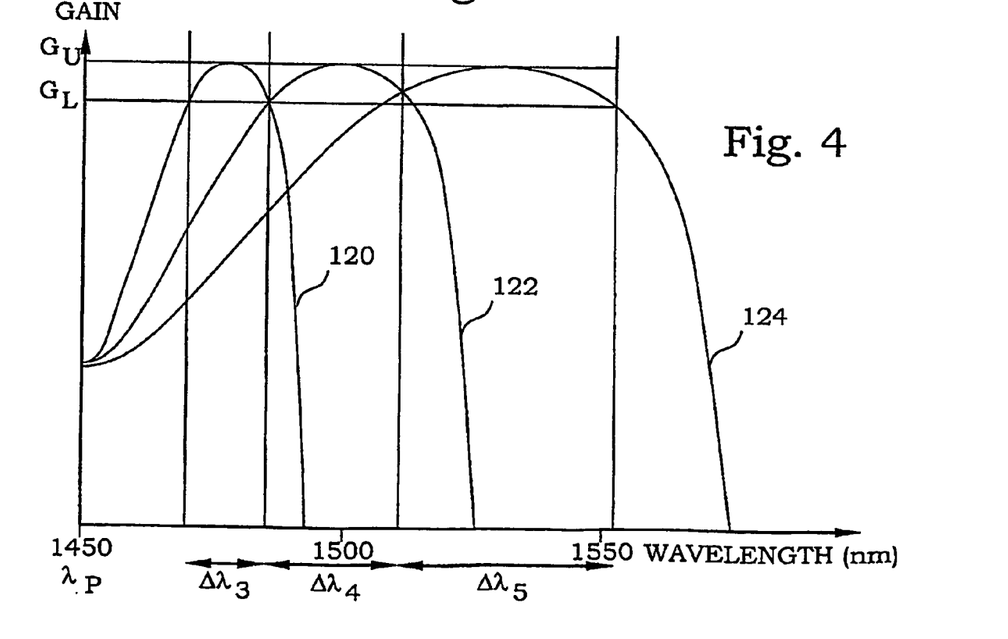
FIG. 4 is a diagram illustrating an ideal gain spectrum of parametric amplification in the embodiment of FIG. 3.

In FIG. 4, a diagram illustrates predicted gain characteristics of idler bands for the three nonlinear optical fibers 12A–C of FIG. 3. Curve 120 corresponds to the first nonlinear optical fiber 12A, which in this particular example has a $\beta_2$ parameter of −0.060 ps²/km. Curve 122 corresponds to the second nonlinear optical fiber 12B, which in this particular example has a $\beta_2$ parameter of −0.020 ps²/km. Curve 124 corresponds to the third nonlinear optical fiber 12C, which in this particular example has a $\beta_2$ parameter of −0.008 ps²/km. Here, also the zero dispersion wavelength $\lambda_0$ is different for the different branches. The optical demultiplexer 14 and optical multiplexer 16 are arranged to allow signals within a first wavelength band $\Delta\lambda_3$ to enter and exit the first nonlinear optical fiber 12A. Similarly, signals of a second wavelength band $\Delta\lambda_4$ are allowed into the second nonlinear optical fiber 12B and finally, signals of a third wavelength band $\Delta\lambda_5$ are allowed into the third nonlinear optical fiber 12C. In each nonlinear optical fiber 12A–C, amplification of a respective sub-band is performed, and the crosstalk-reduced signals are finally combined in the output optical fiber 20.

The result of such amplification is clear from the diagram of FIG. 4. Over a bandwidth ranging from about 1470 nm to about 1550 nm, i.e. an interval of 80 mm, the gain varies only between $G_L$ and $G_U$, which corresponds to a gain variation of just ±4%. It could here be noted that the selected sub-bands do not range all the way down to the pump frequency, but utilizes only the high-gain part of the gain curve. The important feature is, however, that the sub-band should not include the pump wavelength $\lambda_P$. It is believed that in most applications, the sub-band will be situated quite well separated from the pump wavelength $\lambda_P$.

Figure 5:
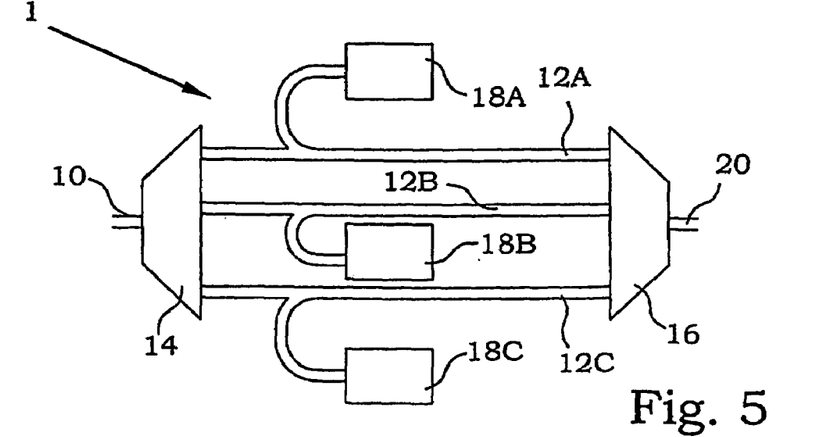
FIG. 5 is a schematic illustration of yet another embodiment of an optical amplifier device according to the present invention.

In FIG. 5 yet another embodiment according to the present invention is illustrated. Also in this embodiment, three nonlinear optical fibers 12A, 12B and 12C are present. The optical demultiplexer 14 and optical multiplexer 16 are adapted accordingly, dividing the incoming optical signals into three sub-bands. In this embodiment, each one of the nonlinear optical fibers 12A–C is pumped with a separate laser pump 18A–C. As an illustrative example, the pump wavelength $\lambda_P$ is set to 1450 nm for the first fiber, 1470 nm for the second fiber and 1490 nm for the third one. In accordance with the situation in FIG. 3, the different nonlinear optical fibers 12A–C have different optical properties.

Figure 6:
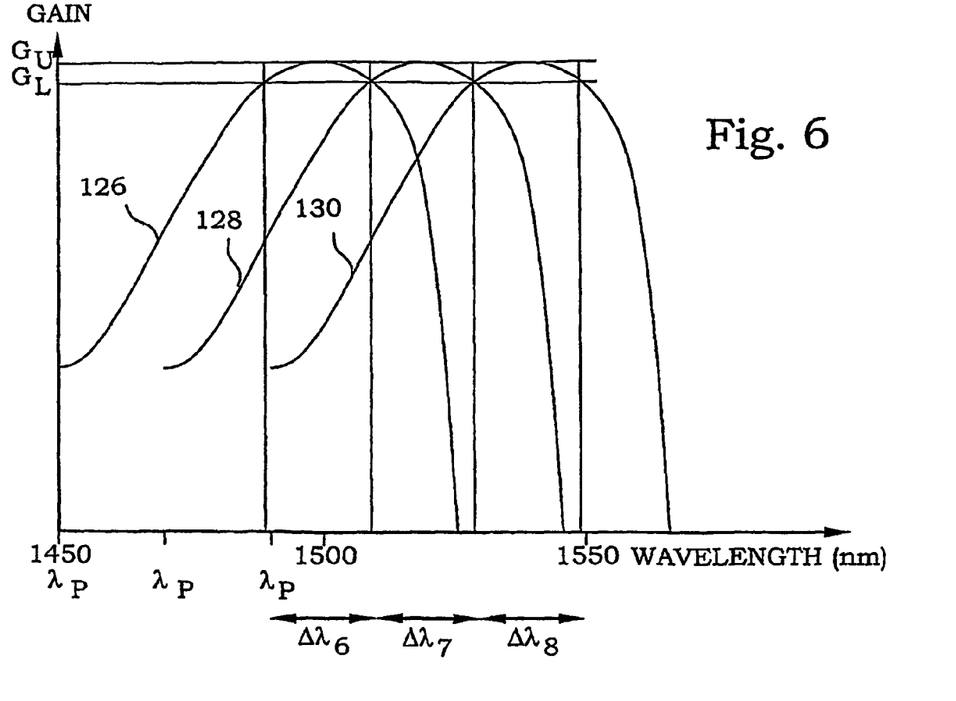
FIG. 6 is a diagram illustrating an ideal gain spectrum of parametric amplification in the embodiment of FIG. 5.

In FIG. 6, a diagram illustrates predicted gain characteristics of idler bands for the three nonlinear optical fibers 12A–C of FIG. 5. All fibers in this illustrative example have a $\beta_2$ parameter of $-0.020$ ps$^2$/km. Curve 126 corresponds to the first nonlinear optical fiber 12A. Curve 128 corresponds to the second nonlinear optical fiber 12B. Curve 130 corresponds to the third nonlinear optical fiber 12C. Here it can be noted that the zero dispersion wavelength $\lambda_0$ is different for the different branches, following the pump wavelength $\lambda_P$. The zero dispersion wavelength $\lambda_0$ is shortest in the first nonlinear optical fiber 12A and longest in the third nonlinear optical fiber 12C. The optical demultiplexer 14 and optical multiplexer 16 are arranged to allow signals within a first wavelength band $\Delta\lambda_6$ to enter and exit the first nonlinear optical fiber 12A. Similarly, signals of a second wavelength band $\Delta\lambda_7$ are allowed into the second nonlinear optical fiber 12B and finally, signals of a third wavelength band $\Delta\lambda_8$ are allowed into the third nonlinear optical fiber 12C. In each nonlinear optical fiber 12A–C, amplification of a respective sub-band is performed, and the crosstalk-reduced signals are finally combined in the output optical fiber 20.

The result of such amplification is clear from the diagram of FIG. 6. Over a bandwidth ranging from about 1487 nm to about 1553 nm, i.e. over an interval of 66 nm, the gain is almost constant (±2%).

In the light of the above embodiments, anyone skilled in the art realizes that various combinations and alternatives are possible. First of all, almost any number of branches, i.e. nonlinear optical fibers, can be used, which increases the possibilities to extend the bandwidth and to improve the total gain characteristics. Each nonlinear optical fiber can be pumped with an own pump or a pump common to one or several other nonlinear optical fibers. The optical fiber in each branch utilizing parametric amplification has dispersive and nonlinear properties, which are adapted for the used pump wavelength and the particular wavelength interval selected by the optical demultiplexer. In each nonlinear optical fiber, either signal band or idler band is utilized, but not both in the same fiber. However, the signal band can be used in one fiber and the idler band can be used in another fiber simultaneously.

Figure 7:
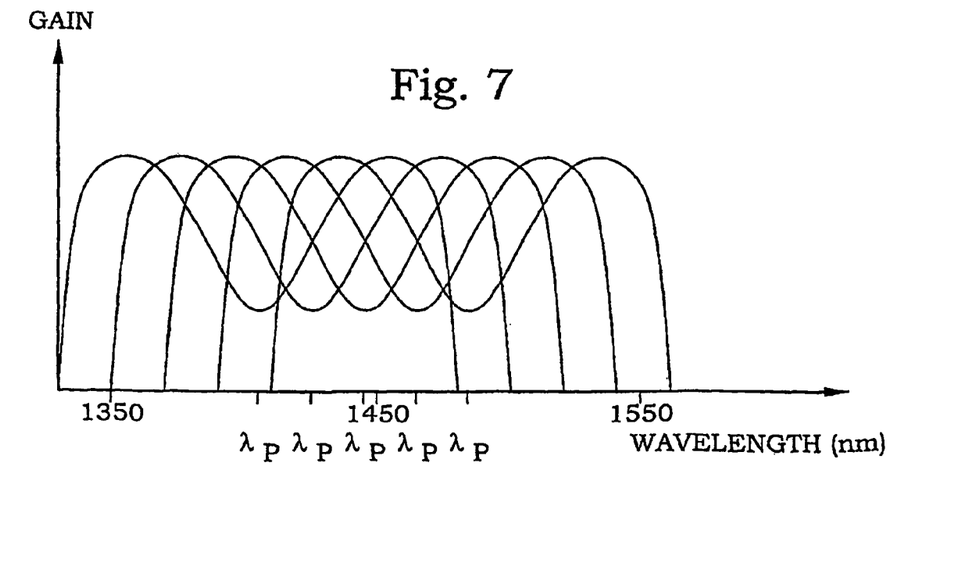
FIG. 7 is a diagram illustrating an ideal gain spectrum of parametric amplification in a ten-branch device according to the present invention.

A gain diagram corresponding to a theoretical 10-branch arrangement is illustrated in FIG. 7. Here, 5 laser pumps are pumping two branches each. In each such pair, one branch utilizes the signal band and the other utilizes the idler band. A useful bandwidth of 240 nm with almost no gain variation at all can thus be provided. This corresponds to almost ten times the normal bandwidth of an amplifier based on rare-earth doping.

The principles of the present invention have also been demonstrated experimentally. Two different Dispersion Shifted Fibers (DSF) with zero dispersion at 1545 nm and 1556 nm, respectively, were pumped using two erbium doped fiber ring lasers. The pump lasers had wavelengths of 1546.6 and 1558.6 nm, respectively. These lasers were tunable and had linewidths of about 0.4 nm. Optical signal to be amplified was generated with a tunable external cavity diode laser. The signal was coupled to one fiber or the other depending on wavelength by a broadband WDM used in reverse direction (as demultiplexer), with the first window or sub-band from 1525 nm to 1540 nm and the second window above 1540 µm. At this point, signal and pump are simultaneously coupled to the appropriate DSF. The signals from the two fibers were combined via another broadband WDM of the same kind (used as a multiplexer) and connected to an optical spectrum analyzer.

The experimental results gave that the whole useful bandwidth with gain above 12 dB was about 27 nm, which is of the same order as usual erbium-doped amplifiers. The entire system was built using only standard dispersion shifted fibers and off-the-shelf optical components.

When evaluating the benefits of the present invention, one realizes that the performance is strongly dependent on the actual choice of fiber properties, pump wavelengths and pump powers. By tailoring parameters of the fiber, e.g. nonlinear coefficient $\gamma$ or dispersion terms, suitable gain responses can be achieved. Most commonly used fibers have nonlinear coefficients $\gamma$ of up to 2 W$^{-1}$km$^{-1}$. However, optical fibers with nonlinear coefficients of 20 W$^{-1}$km$^{-1}$ are not unusual today. Since the total gain strongly depends on the pump power, the fiber length and the nonlinear coefficient, nonlinear coefficients $\gamma$ over 10 W$^{-1}$km$^{-1}$ are to prefer.

Figure 8:
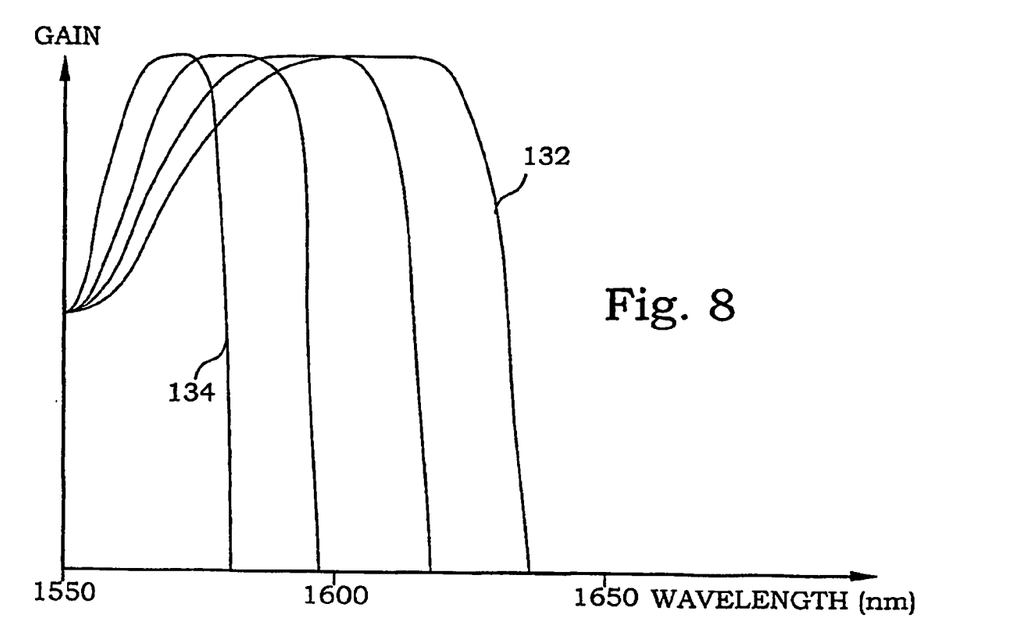
FIG. 8 is a diagram illustrating gain spectrum of parametric amplification in nonlinear optical fibers having different second and fourth order dispersion coefficients.

Dispersion terms, such as zero dispersion wavelengths $\lambda_0$ and second order dispersion coefficient $\beta_2$ can be varied during manufacturing of optical fibers, in order to adjust each nonlinear fiber to suit a specific wavelength region. It is also found that even the fourth order dispersion coefficient $\beta_4$ is useful in tailoring suitable fiber properties. In FIG. 8, a set of gain spectra with varying $\beta_4$ parameter is illustrated. The $\beta_4$ varies here from $1.0 \cdot 10^{-4}$ ps$^4$ km$^{-1}$ to $5.0 \cdot 10^{-3}$ ps$^4$km$^{-1}$ with a fixed fiber nonlinearity of $\gamma=15$ km$^{-1}\cdot P_P$ and a fiber length L=0.20 km ($\beta_2$ also varies from $-0.0316$ to $-0.224$ ps$^2$/km). A lower $\beta_4$ value gives generally a flatter and wider gain curve, see curve 132. A higher $\beta_4$ value gives generally a narrower gain curve, see curve 134. Comparing FIG. 8 with FIG. 4, it is clear that the gain variation over the entire bandwidth of the FOPA can approach zero without the need for additional flattening devices. In this manner the combination possibilities are practically unlimited, and further developments in fiber optic design increase the possibilities. With proper fiber designs, coverage of a total wavelength band of 1250–1650 nm should be possible.

Figure 9:
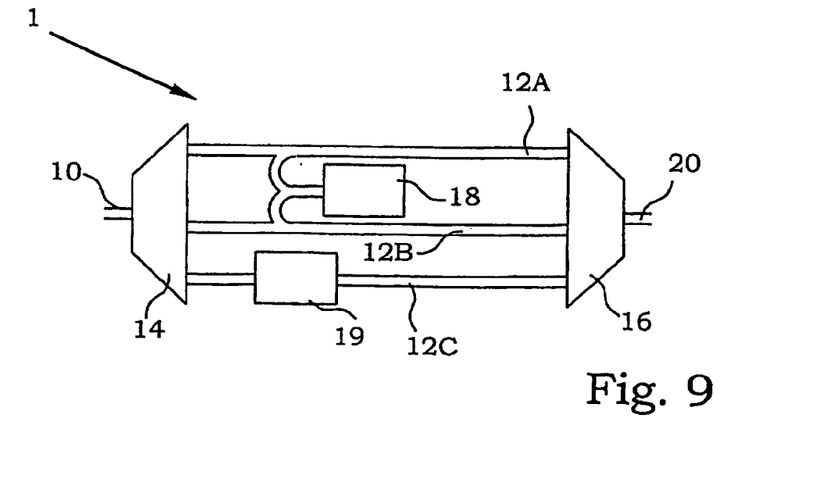
FIG. 9 is a schematic illustration of a hybrid embodiment of the present invention utilizing a combination with other amplification methods.

Another embodiment of the present invention is illustrated in FIG. 9. Here two parallel branches of nonlinear optical fibers are pumped with one common pump. One of these branches amplifies signals within the high gain part of the signal band and the other branch amplifies signals within the high gain part of the idler band. However, a wavelength band in between these high gain bands is not covered by these branches. A third branch takes care of this wavelength band. In this branch another optical amplifying technology 19 is applied, e.g. rare-earth doped amplifiers, Raman amplifiers etc.

Figure 10:
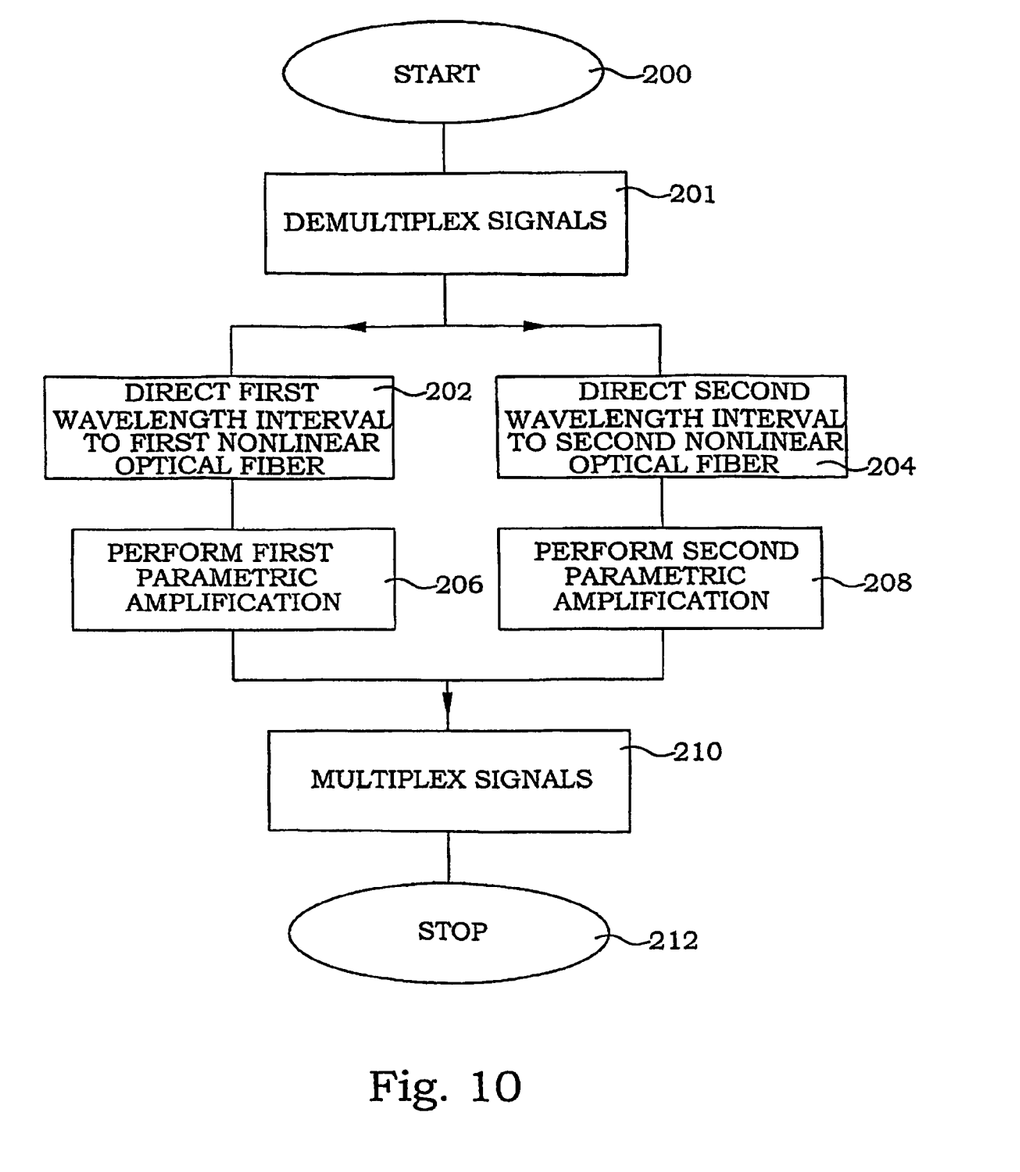
FIG. 10 is a flow-diagram illustrating one embodiment of a method according to the present invention.

An embodiment of a procedure according to the present invention is illustrated by a flow diagram in FIG. 10. The procedure starts in step 200. In step 201, optical signals are demultiplexed into a first wavelength interval and a second wavelength interval. In step 202, signals of the first wavelength interval are directed to a first nonlinear optical fiber. In parallel, in step 204, signals of the second wavelength interval are directed to a second nonlinear optical fiber. In step 206, a first parametric amplification is performed by supplying the nonlinear fiber with light from a pump with a suitable wavelength. In parallel, in step 208, a second parametric amplification is performed. Finally, the amplified optical signals are multiplexed into a final outgoing signal in step 210. The procedure is ended in step 212.

Figure 11:
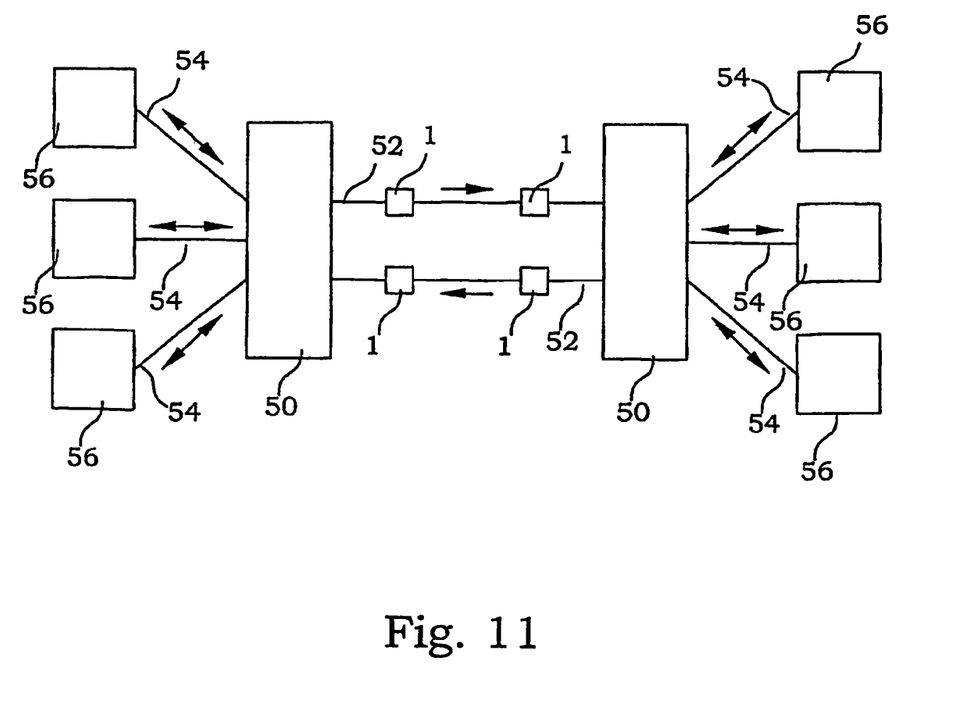
FIG. 11 is a block scheme of an optical system, in which amplifier devices according to the present invention preferably are utilized.

In FIG. 11, a general optical communication system is illustrated, in which an optical amplifier device according to the present invention is used with advantage. A number of nodes 56 communicate by dual-directed links 54 with a hub 50. The hub 50 multiplexes the different signals according to a WDM scheme, and preferably according to DWDM, onto an optical fiber 52 interconnecting two hubs 50. Along the way, the optical signals are attenuated, and at certain positions along the optical fiber 52, the optical signals have to be amplified by optical amplifier devices 1, preferably according to the present invention. Anyone skilled in the art, understands that the use of the principles of the present invention are not limited to e.g. hub-and-spoke topologies, but operates in any other types of optical networks, e.g. based on ring topologies, point-to-point, point-to-multipoint. The principles are, however, best utilized in systems taking advantage of wavelength multiplexing techniques.

It will be understood by those skilled in the art that various further modifications and changes may be made to the present invention without departure from the scope thereof, which is defined by the appended claims.

REFERENCES

U.S. Pat. No. 5,452,116; U.S. Pat. No. 6,049,417; U.S. Pat. No. 6,239,903;

M. C. Ho, K. Uesaka, M. E. Marhic, Y. Akasaka and L. G. Kazovsky, "200-nm-Bandwidth Fiber Optical Amplifier Combined Parametric and Raman Gain", IEEE J. Lightwave Technol. 19, 977–979 (2001);

J. Hansryd and P. A. Andrekson, "Broad-band continuous-wave-pumped fiber optical parametric amplifier with 49-dB gain and wavelength-conversion efficiency", IEEE Photon. Technol. Lett. 13, 194–196 (2001);

C. J. McKinstrie, S. Radic and A. R. Chraplyvy, "Parametric amplifiers driven by two pump waves", IEEE Select. Topics Quantum Electron. 8, 538–547 (2002).

G. P. Agrawal, "Nonlinear fiber optics", 2nd ed., Academic Press, San Diego, 1995, pp. 404–435.

J. Hansryd, P. A. Andrekson, M. Westlund, J. Li and P.-O. Hedekvist, "Fiber-based optical parametric amplifiers and their applications", IEEE Select. Topics Quantum Electron. 8, 506–520 (2002).

What is claimed is:

1. Optical amplifier device comprising:
optical inputs;
a first nonlinear optical fiber, having a first set of fiber property parameters, comprising a first zero-dispersion wavelength;
a second nonlinear optical fiber, having a second set of fiber property parameters, comprising a second zero-dispersion wavelength;
optical demultiplexer connecting said optical input and said first and second nonlinear optical fibers, directing optical signals within a first wavelength interval to said first nonlinear optical fiber and directing optical signals within a second wavelength interval to said second nonlinear optical fiber;
at least one optical pump, pumping said first and second nonlinear optical fibers with radiation having a pump wavelength in the vicinity of respective said zero-dispersion wavelength;
said first nonlinear optical fiber giving a high parametric amplification in said first wavelength interval and said second nonlinear optical fiber giving a high parametric amplification in said second wavelength interval;
optical outputs; and
optical multiplexer connecting said first and second nonlinear optical fibers and said optical output, merging optical signals from said first and second nonlinear optical fibers into said optical output;
a pump wavelength provided to said first nonlinear optical fiber being positioned outside said first wavelength interval and a pump wavelength provided to said second nonlinear optical fiber being positioned outside said second wavelength interval.

2. Optical amplifier device according to claim 1, wherein said first wavelength interval being positioned at a high-gain portion of a gain distribution of said parametric amplification in said first nonlinear optical fiber, and said second wavelength interval being positioned at a high-gain portion of a gain distribution of said parametric amplification in said second nonlinear optical fiber.

3. Optical amplifier device according to claim 1, wherein said first set of fiber property parameters is different from said second set of fiber property parameters.

4. Optical amplifier device according to claim 1, wherein said first nonlinear optical fiber and said second nonlinear optical fiber are pumped with one common optical pump, whereby said first and second nonlinear optical fibers are pumped with the same pump wavelength.

5. Optical amplifier device according to claim 4, wherein said first nonlinear optical fiber has a second order dispersion coefficient $\beta_2$ different from the second order dispersion coefficient $\beta_2$ of said second nonlinear optical fiber.

6. Optical amplifier device according to claim 1, wherein said first nonlinear optical fiber is pumped with a first optical pump and said second nonlinear optical fiber is pumped with a second optical pump.

7. Optical amplifier device according to claim 6, wherein said first optical pump has a pump frequency different from the pump frequency of said second optical pump.

8. Optical amplifier device according to claim 7, wherein said first and second nonlinear optical fibers substantially have the same second order dispersion coefficients $\beta_2$.

9. Optical amplifier device according to claim 3, wherein said first nonlinear optical fiber has a zero dispersion wavelength different from the zero dispersion wavelength of said second nonlinear optical fiber.

10. Optical amplifier device according to claim 1, wherein said first set of fiber property parameters is substantially the same as said second set of fiber property parameters.

11. Optical amplifier device according to claim 1, wherein said first wavelength interval covers at least a part of a signal band of said parametric amplification of said first nonlinear optical fiber.

12. Optical amplifier device according to claim 1, wherein said second wavelength interval covers at least a part of an idler band of said parametric amplification of said second nonlinear optical fiber.

13. Optical amplifier device according to claim 1, further comprising at least one further optical fiber connected between said optical demultiplexer and said optical multiplexer, whereby each optical fiber receives optical signals within a respective wavelength interval from said optical demultiplexer.

14. Optical amplifier device according to claim 13, wherein at least one of said at least one further optical fiber is provided with a non-parametric amplification.

15. Optical amplifier device according to claim 1, wherein at least one of said nonlinear optical fibers has a fourth order dispersion coefficient $\beta_4$, adapted to give a flat gain band within the associated wavelength interval.

16. Optical amplifier device according to claim 1, wherein said first and second nonlinear optical fibers have non-linearity coefficients $\gamma$ exceeding $10\ km^{-1}W^{-1}$.

17. Fiber-optical communication system, comprising an optical amplifier device, said optical amplifier device in turn comprising:
   optical input;
   a first nonlinear optical fiber, having a first set of fiber property parameters, comprising a first zero-dispersion wavelength;
   a second nonlinear optical fiber, having a second set of fiber property parameters, comprising a second zero-dispersion wavelength;
   optical demultiplexer connecting said optical input and said first and second nonlinear optical fibers, directing optical signals within a first wavelength interval to said first nonlinear optical fiber and directing optical signals within a second wavelength interval to said second nonlinear optical fiber;
   at least one optical pump, pumping said first and second nonlinear optical fibers with radiation having a pump wavelength in the vicinity of respective said zero-dispersion wavelength;
   said first nonlinear optical fiber giving a high parametric amplification in said first wavelength interval and said second nonlinear optical fiber giving a high parametric amplification in said second wavelength interval;
   optical output; and
   optical multiplexer connecting said first and second nonlinear optical fibers and said optical output, merging optical signals from said first and second nonlinear optical fibers into said optical output;
   a pump wavelength provided to said first nonlinear optical fiber being positioned outside said first wavelength interval and a pump wavelength provided to said second nonlinear optical fiber being positioned outside said second wavelength interval.

18. Fiber-optical communication system according to claim 17, wherein said fiber optical system is arranged to use wavelength division multiplexing.

19. Fiber-optical communication system according to claim 18, wherein said fiber optical system is arranged to use dense wavelength division multiplexing.

20. Method for optical amplifying, comprising the steps of:
   directing optical signals within a first wavelength interval to a first nonlinear optical fiber;
   directing optical signals within a second wavelength interval to a second nonlinear optical fiber;
   performing first parametric amplification in said first nonlinear optical fiber, by pumping with radiation of a first pump wavelength;
   performing second parametric amplification in said second nonlinear optical fiber, by pumping with radiation of a second pump wavelength;
   said first pump wavelength being positioned outside said first wavelength interval and said second pump wavelength being positioned outside said second wavelength interval; and
   multiplexing amplified signals from said first and second nonlinear optical fibers.

21. Method according to claim 20, wherein said first wavelength interval being positioned at a high-gain portion of a gain distribution of said first parametric amplification and said second wavelength interval being positioned at a high-gain portion of a gain distribution of said second parametric amplification.

22. Method according to claim 20, further comprising the step of pumping said first nonlinear optical fiber and said second nonlinear optical fiber with optical signals having substantially the same wavelength.

23. Method according to claim 22, further comprising the step of pumping said first nonlinear optical fiber with a first optical signal and pumping said first nonlinear optical fiber with a second optical signal having a wavelength different from the wavelength of said first optical signal.

24. Method according to claim 20, wherein said first wavelength interval covers at least a part of a signal band of said parametric amplification of said first nonlinear optical fiber.

25. Method according to claim 20, wherein said second wavelength interval covers at least a part of an idler band of said parametric amplification of said second nonlinear optical fiber.

* * * * *